United States Patent
Dixon et al.

(10) Patent No.: US 11,093,893 B2
(45) Date of Patent: Aug. 17, 2021

(54) APPARATUS AND METHOD OF MAINTAINING ACCURATE PERPETUAL INVENTORY INFORMATION

(71) Applicant: Walmart Apollo, LLC, Bentonville, AR (US)

(72) Inventors: Gregory D. Dixon, Rogers, AR (US); Ashley D. Taylor, Rogers, AR (US); Robert W. Utting, Jr., Bella Vista, AR (US); Jesse L. Eaton, Springdale, AR (US); Sarah L. Im, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 842 days.

(21) Appl. No.: 15/541,283

(22) PCT Filed: Dec. 18, 2015

(86) PCT No.: PCT/US2015/066656
§ 371 (c)(1),
(2) Date: Jun. 30, 2017

(87) PCT Pub. No.: WO2016/109251
PCT Pub. Date: Jul. 7, 2016

(65) Prior Publication Data
US 2018/0005174 A1 Jan. 4, 2018

Related U.S. Application Data

(60) Provisional application No. 62/098,657, filed on Dec. 31, 2014.

(51) Int. Cl.
*G06Q 10/08* (2012.01)
*G06Q 30/02* (2012.01)

(52) U.S. Cl.
CPC ....... *G06Q 10/087* (2013.01); *G06Q 30/0202* (2013.01)

(58) Field of Classification Search
CPC .................. G06Q 10/087; G06Q 30/0202
See application file for complete search history.

(56) References Cited

U.S. PATENT DOCUMENTS 7,222,786 B2  5/2007 Renz
7,480,623 B1  1/2009 Landvater
(Continued)

FOREIGN PATENT DOCUMENTS

WO    2003054756    7/2003

OTHER PUBLICATIONS

PCT; App. No. PCT/US2015/066656 ; International Search Report and Written Opinion dated Mar. 11, 2016.

*Primary Examiner* — Nadja N Chong Cruz
(74) *Attorney, Agent, or Firm* — Fitch, Even, Tabin & Flannery LLP (57) ABSTRACT

Methods and apparatuses are provided for use in managing product inventory, comprising: a control circuit; a memory storing instructions to cause the control circuit to perform: obtain a reference on-hand quantity value; determine an estimated on-hand adjustment value corresponding to a predicted error between the reference on-hand quantity value and a predicted actual on-hand value; receive a retail store supplied on-hand adjustment value; set an on-hand adjustment value to the retail store supplied on-hand adjustment value when the retail store supplied on-hand adjustment value is within an on-hand variation threshold; modify the estimated on-hand adjustment value as a function of a difference between the retail store supplied on-hand adjustment value and the estimated on-hand adjustment value when the retail store supplied on-hand adjustment value is not within the on-hand variation threshold, and set the (Continued)

on-hand adjustment value to the modified estimated on-hand adjustment value.

20 Claims, 4 Drawing Sheets

(56) References Cited

U.S. PATENT DOCUMENTS

| | | | | |
|---|---|---|---|---|
| 2002/0138336 A1* | 9/2002 | Bakes | ................ | G06Q 10/087 |
| | | | | 705/28 |
| 2003/0093307 A1 | 5/2003 | Renz | | |
| 2003/0126103 A1 | 7/2003 | Chen | | |
| 2006/0015532 A1 | 1/2006 | Mizell | | |
| 2011/0054984 A1* | 3/2011 | Bateni | ................ | G06Q 10/087 |
| | | | | 705/7.31 |
| 2012/0166313 A1* | 6/2012 | Sielatycki | ............. | G06Q 10/08 |
| | | | | 705/26.81 |
| 2012/0271740 A1* | 10/2012 | Connors | ............. | G06Q 10/087 |
| | | | | 705/28 |
| 2014/0122179 A1 | 5/2014 | Chan | | |

* cited by examiner

APPARATUS AND METHOD OF MAINTAINING ACCURATE PERPETUAL INVENTORY INFORMATION

RELATED APPLICATION(S)

This application is filed in accordance with 35 U.S.C. 371 claiming priority to International Application No. PCT/US2015/066656, with international filing date of Dec. 18, 2015, which is incorporated by reference in its entirety herein and which claims the benefit of U.S. Provisional Application No. 62/098,657, filed Dec. 31, 2014, which is incorporated by refine in its entirety herein.

TECHNICAL FIELD

This invention relates generally to inventory of a retail store.

BACKGROUND

In a retail environment, it can be important that product inventory be moved through a retail location or store. It is typically also important to track inventory. Often errors in actual inventory occur. These errors can affect the accuracy of inventory information. In a retail environment, accuracy of inventory can be important to an effective and efficient supply chain. For example, inventory records are used in forecasting, ordering and replenishment of products. Traditionally, actual and accurate knowledge of a retailers' on-hand inventory of products is difficult to obtain. Many factors can throw off the true on hand inventory. Thus, retailers only have accurate information as to what inventory the system thinks is on-hand, which can be referred to as perpetual inventory (PI).

Inaccurate PI with respect to an inventory product is a condition where the perpetual inventory is a higher or lower number than the actual number of items on-hand for the product. For example, the PI is overstated when there is less actual inventory than indicated by the system. Again, incorrect inventory information can adversely affect the number of products on the shelves, ordering and profits.

BRIEF DESCRIPTION OF THE DRAWINGS

Disclosed herein are embodiments of apparatuses and methods pertaining to identifying products for which it might be beneficial determine store level perpetual inventory fluctuations and to adjust inventory information in an effort to more accurately reflect actual on-hand store inventory. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, processes and methods are provided herein that allow for more accurate tracking and/or predicting store level perpetual inventory fluctuations that can be used to adjust inventory information to more accurately reflect actual on-hand store inventory for one or more retail stores or locations. The accurate on-hand inventory allows for more accurate product ordering from distribution centers and/or other product sources, while reducing storage requirements and having to discard or throw away products (e.g., due to expiration dates, event and/or holidays, and the like). Accordingly, replenishment is dependent on store inventory level accuracy of on-hand perpetual inventory. Further, some embodiments determine and/or calculate more accurate on-hand store inventory for one or more products and typically hundreds to tens of thousands of products while accommodating for the on-hand inventory level variables. Some embodiments further identify adjustments and/or adjustment logic to continue to determine and/or anticipate accurate on-hand inventory.

Figure 1:
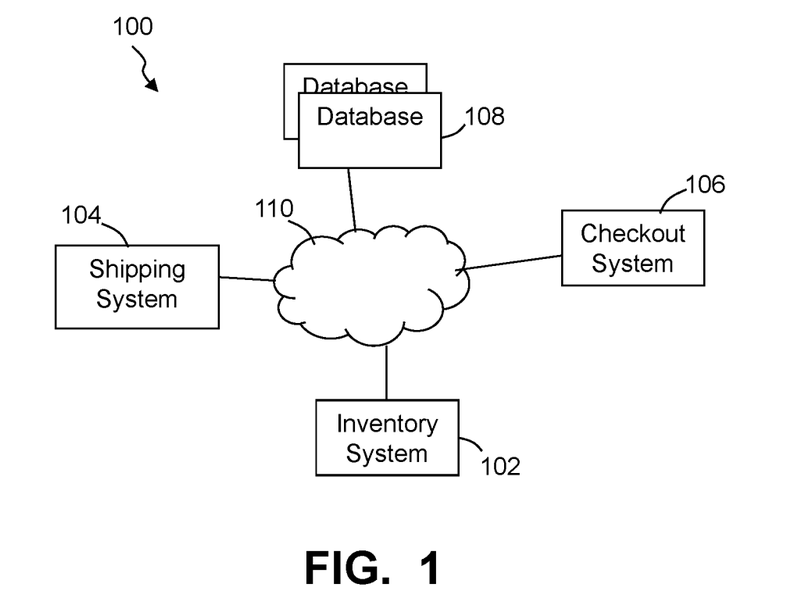
FIG. 1 illustrates a simplified block diagram of an exemplary store management system for use in more accurately monitoring and determining on-hand store inventory for numerous different products for sale through one or more retail stores, in accordance with some embodiments.

FIG. 1 illustrates a simplified block diagram of an exemplary store management system 100 for use in more accurately monitoring and determining on-hand store inventory for numerous different products for sale through one or more retail stores, in accordance with some embodiments. In some implementations, the store management system 100 is configured to monitor and manage a single store location, while in other embodiments the system may provide management over multiple store locations. For simplicity, the embodiments below are described with respect to a single retail store. It will be appreciated by those skilled in the art that some embodiments can be applicable to multiple stores and/or the management of inventory at one or more stores and/or distribution centers. Further, the store management system may be operated local at a store location or remote from the store location.

In some embodiments, the store management system 100 includes an inventory system 102, a shipping system 104 and a checkout system 106. Some embodiments may include one or more databases 108 and/or digital storage media. Further, the inventory system, shipping system, checkout system and databases are typically communicationally coupled to one or more of each other through one or more communication networks 110, such as a distributed network 110, buses, direct coupling or the like, or a combination thereof. The network 110 can be a local area network (LAN), a wide area network (WAN), the Internet and/or other such communication networks and/or communication connections. Further, although the inventory system 102, a shipping system 104, a checkout system 106, and databases 108 are illustrated as distinct components, in some embodiments two or more of these systems may be combined and/or may operate through a single system.

The inventory system 102 is configured to monitor and track product inventory for hundreds to tens of thousands or more products offered or to be offered for sale through a retail store or multiple stores. Further, the inventory system is configured to acquire information that can be used in updating and/or validating on-hand inventory that specifies a quantity value of each of the multiple different products at the retail store (or expected to be received at the store) and intended to be sold through the retail store. The shipping system 104, in part, tracks shipments of products received at the store, and in some instances, further generates and/or allows one or more store employees to generate and/or confirm orders for multiple different products from one or more suppliers (e.g., a distribution center of a chain of retail stores of which the store of interest is one, a third party source, or other such supplier).

The checkout system 106 communicates with and/or includes registers that are used at the store to ring up products and complete sales of products to customers. In some implementations, the checkout system tracks and/or reports each sale and notifies the inventory system 102 such that the inventory system can update the on-hand inventory information, which typically includes at least on-hand inventory quantity values corresponding to each product. In some embodiments, the inventory system automatically updates the on-hand inventory value without user interaction, and in many instances continuously updates the on-hand inventory information.

Figure 2:
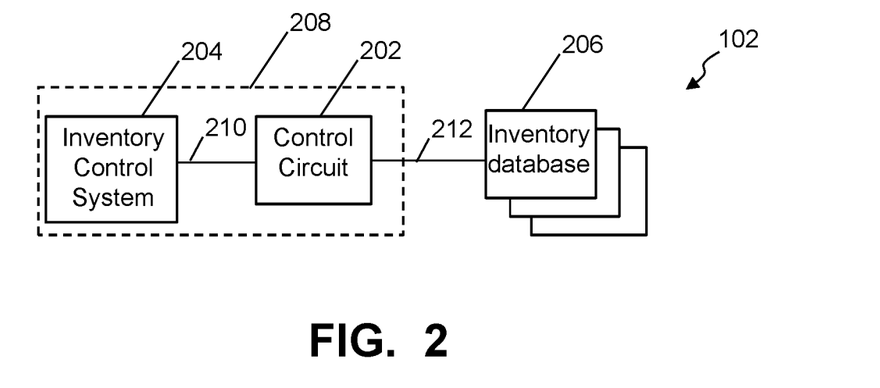
FIG. 2 shows a simplified block diagram of an exemplary inventory system, in accordance with some embodiments.

FIG. 2 shows a simplified block diagram of an exemplary inventory system 102, in accordance with some embodiments, including a control circuit 202 coupled to an inventory control system 204 (e.g., via link 210) and to one or more inventory databases 206 (e.g., via link 212), which may be part of or separate from the databases 108. The databases 206 store cyclic sales data such as on-hand inventory values for a plurality of products, such as products for sale in one or more retail stores. For example, the databases 206 store, for each of a plurality of products, the number of items or units of the product sold in a given period of time (e.g., in a day) at a given store and/or the on-hand value of the product (i.e., the total number of items of the product in a given store at a particular moment in time). In a typical retail setting, the databases 206 may store cyclic sales data for many products being sold. For example, the databases 206 may store sales data and/or inventory levels for at least 100 different products for sale by the retail store; at least 1,000 different products for sale by the retail store; or at least 10,000 different products for sale by the retail store.

In accordance with some embodiments, the control circuit 202 receives cyclic sales data and/or inventory levels for one or more products being evaluated to determine perpetual inventory (PI) conditions and/or values. Embodiments of this process are described further herein. The control circuit 202 may be located at a given retail store location and receive and process sales data for products sold at that location, i.e., the control circuit is a decentralized system for determining and quantifying inventory conditions. In other embodiments, the control circuit 202 may be located at a location remote from the retail store and/or from the one or more inventory databases 206. For example, the control circuit is coupled to the inventory databases 206 via the link 212, which may be the network 110 (e.g., a wide area network or other wired and/or wireless network connection). In some embodiments, the control circuit 202 is at a separate location than the location of the inventory control system 204, i.e., the control circuit is a centralized system for determining and quantifying inventory conditions. For example, the control circuit 202 is coupled to the inventory control system 204 via the link 210 which may be the network 110, or other wide area network or other wired and/or wireless network connection. In some embodiments, the control circuit is at the site or location of the inventory control or is part of the inventory control (such as shown by dashed box 208). In some embodiments, the inventory control system 204 functions as the inventory management system for one or more retail stores, and may be responsible for at least forecasting, ordering and replenishing products. It is understood that the control circuit may be configured to determine and/or adjust predicted and/or actual on-hand inventory values with respect to one or more products of inventory in one or more retail spaces.

Figure 3:
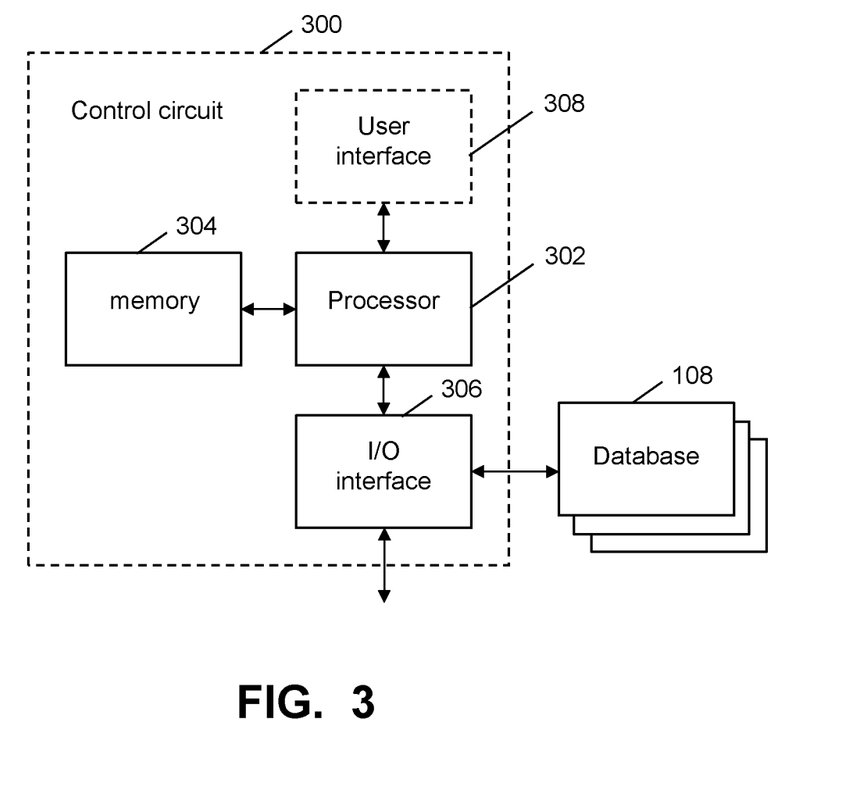
FIG. 3 illustrates a simplified block diagram of an exemplary control circuit such as generally shown in FIG. 2, in accordance with some embodiments.

FIG. 3 illustrates a simplified block diagram of an exemplary control circuit such as generally shown in FIG. 2, in accordance with some embodiments. The control circuit 300 includes a one or more processors and/or microprocessors 302, one or more memory 304, one or more input/output (I/O) interfaces 306 (e.g., a backend interface) and one or more optional user interfaces 308 (e.g., a frontend interface). Generally, the memory 304 stores the operational code or set of instructions that is executed by the processor 302 to implement the functionality of the control circuit. In some embodiments, the memory 304 may also store some or all of particular data that may be needed to make any of the determinations and/or corrections described herein. Such data may be pre-stored in the memory or be received, for example, from the one or more databases 108 and/or the inventory control system 204 during use. It is understood that the processor 302 may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the control circuit 300; however, the memory 304 can be internal, external or a combination of internal and external memory. Additionally, the control circuit may include a power supply (not shown) or it may receive power from an external source.

The processor 302 and the memory 304 may be integrated together, such as in a microcontroller, application specification integrated circuit, field programmable gate array or other such device, or may be separate devices coupled together. The I/O interface 306 allows communicational coupling of the control circuit to external components, such as the inventory databases 108, the shipping system 104, the checkout system 106, the inventory control system 204, other such systems and/or one or more user devices. Accordingly, the I/O interface 306 may include any known wired and/or wireless interfacing device, circuit and/or connecting device. In some embodiments, a user interface 308 is included in the control circuit 300 which may be used for user input and/or output display. For example, the user interface 308 may include any known input devices, such a buttons, knobs, selectors, switches, keys, touch input surfaces and/or displays, etc. Additionally, the user interface 308 may include one or more output display devices, such as lights, visual indicators, display screens, etc. to convey information to a user, such as an inventory information, on-hand inventory values, store supplied on-hand adjustment values, estimated on-hand inventory values, notifications, error values and/or conditions and other such information. While FIG. 3 illustrates the various components being coupled together via the processor 302, it is understood that the various devices may actually be coupled to a communication bus of the control circuit 300 to which the processor 302 and/or memory 304 may also be coupled.

Generally, the control circuits 202 and 300 can comprise a fixed-purpose hard-wired platform or can comprise a partially or wholly programmable platform. These architectural options are well known and understood in the art and require no further description here. These control circuits 202 and 300 are configured (for example, by using corresponding programming as will be well understood by those skilled in the art) to carry out one or more of the steps, actions, and/or functions described herein.

The inventory system 102 receives numerous inputs and utilizes those inputs in determining on-hand inventory values for multiple different products. Further, in some embodiments, the inventory system determines and/or calculates on-hand inventory adjustment values corresponding to multiple different products. The on-hand inventory adjustment values are used to adjust an on-hand inventory value based on determined and/or predicted errors of a reference on-hand inventory (or sometimes referred to as a reference on-hand quantity value). In some embodiments, the reference on-hand quantity value is an expected or ideal value of the product of interest based on known factors. For example, in some implementations, the reference on-hand quantity value is defined by a previously determined and/or received on-hand value (e.g., based on employee counts, previously adjusted on-hand value, etc.) that is modified in response to recent known activities, such as but not limited to a shipment of the product received, known sales of one or more items of the product, known throw-aways, and the like. Accordingly, the reference on-hand quantity value can in some embodiments be assumed as an ideal on-hand value that does not take into consideration potential errors and/or unknown information that may cause the on-hand value to in fact vary from the assumed ideal on-hand value.

Typically, the inventory system 102 maintains the reference on-hand inventory by updating the reference on-hand inventory based on sales of products through the checkout system, items that are thrown away by employees and reported to the inventory system, and other such factors. It has been identified, however, that numerous errors and/or inaccuracies may be reported to the inventory system that may result in an erroneous reference on-hand inventory quantity value. Similarly, events may occur that are not reported to the inventory system that can result in the reference on-hand inventory being inaccurate, such as products being stolen from the store (i.e., no record of the product being removed from the store), products may be thrown away (e.g., due to expiration of shelf life) without being reported to the inventory system, incorrect shipments may be received (e.g., ordered 500 cases of a product and only 490 cases are received), employees may incorrectly input information (e.g., manually input adjustments to an on-hand inventory quantity value for a particular product, such as based on a count performed by the employee), and other such errors, and typically a combination of two or more of these errors.

Accordingly, some embodiments compensate for these errors and/or predict that errors are to occur and compensate for the predicted errors. The systematic replenishment of products at the store is dependent on store level accuracy of on-hand perpetual inventory. Some embodiments provide processes and/or methods to determine and/or calculate the on-hand inventory while adjusting for the store level variables to produce a more accurate on-hand inventory quantity value.

Figure 4:
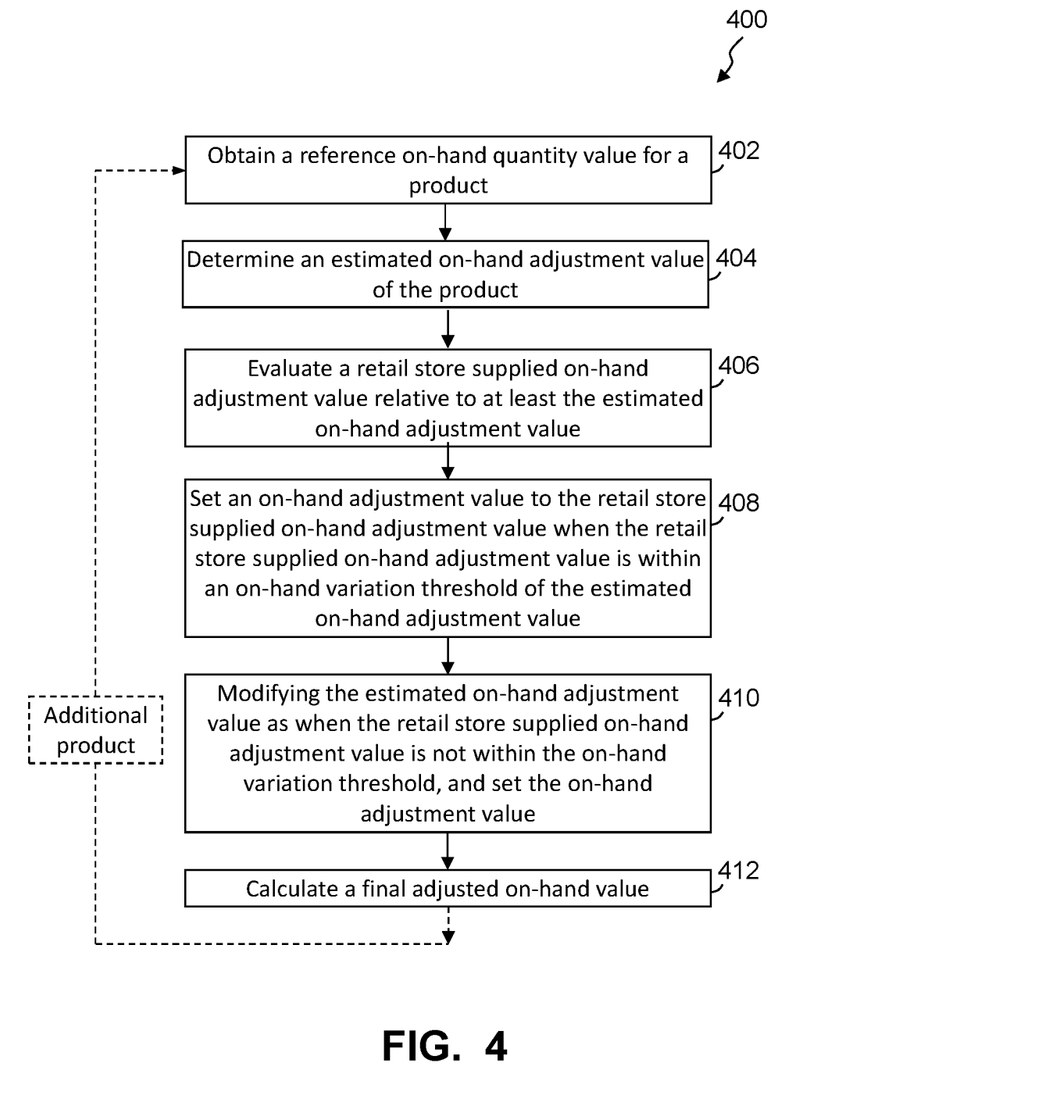
FIG. 4 shows a simplified flow diagram of an exemplary process of managing product inventory and/or adjusting on-hand inventory values for each of multiple different products at a retail store, in accordance with some embodiments.

FIG. 4 shows a simplified flow diagram of an exemplary process 400 of managing product inventory and/or adjusting on-hand inventory values for each of multiple different products at a retail store, in accordance with some embodiments. The process is typically performed for each of multiple different products. In step 402, a reference on-hand inventory quantity value for one or more products is obtained through the inventory system. As introduced above, the reference on-hand quantity value provides a reference quantity of the product expected to be at the retail store and available to be sold at a time of evaluating inventory of at least the product of interest and for which the inventory is being evaluated. In step 404, an estimated on-hand adjustment value of the product is determined. Again, errors are expected relative to the reference on-hand quantity value, and the inventory system estimates an on-hand adjustment value that corresponds to a predicted error between the reference on-hand quantity value and a predicted actual on-hand value at the retail store that is predicted to be the true and actual or at least a more accurate quantity of the product of interest. The estimated on-hand adjustment value is intended to be used in correcting the reference inventory value to obtain a corrected and final adjusted on-hand value.

In step 406, a retail store supplied on-hand adjustment value is received and evaluated relative to at least the estimated on-hand adjustment value. In many implementations, some or all of the store supplied on-hand adjustment values are received from a store employee and/or is supplied by the inventory system based on data inputted by one or more store employees, such as throw-aways, employee entered manual counts of items of a product, identifying one or more items are missing or have been stolen, receiving items of a product from a non-traditional source (e.g., direct to store delivery, U.S. Postal Service, third party delivery, etc.), and/or other such information.

In step 408, an on-hand adjustment value is set to the store supplied on-hand adjustment value when, based on the evaluation and/or comparison of the store supplied on-hand adjustment value and the estimated on-hand adjustment value, the store supplied on-hand adjustment value is within an on-hand variation threshold of the estimated on-hand adjustment value. The on-hand variation threshold may vary based on one or more factors, such as but not limited to the product of interest, time of year, number of store supplied on-hand adjustment values, time the store supplied on-hand adjustment value is received, and other such factors. Similarly, the on-hand variation threshold may vary over time based, at least in some implementations, on one or more of the factors. For example, factors in determining the threshold for accepting the store on-hand adjustments verse the derived values can include independent count audits and store level feedback from management. Systematically the values can be adjusted based on the statistical increase in adjustment volume across the total store count for a given product (e.g., there is a 15% increase in store level adjustments for item X across all stores for a statistically relevant timeframe. If the value is outside of a tolerance, then the acceptance rate can be adjusted or error factors revised.) Additionally, some embodiments may consider variations from other stores. For example, if a store adjustment is within a relative tolerance that is also seen across multiple stores the on-hand variation threshold may be adjusted to take this into consideration (e.g., a current setting=5%, but adjustments from multiple stores are coming in at 7%, the system may adjust to the more statistically consistent 7%.) Further, timeframes may be variable based on historical statistical performance.

Alternatively, in step 410, the estimated on-hand adjustment value is modified when the store supplied on-hand adjustment value is not within the on-hand variation threshold of the estimated on-hand adjustment value. In some implementations the estimated on-hand adjustment value is modified as a function of a difference between the store supplied on-hand adjustment value and the estimated on-hand adjustment value. Further, the on-hand adjustment value is set to the modified estimated on-hand adjustment value. Some embodiments allow manual intervention, such as adjustments inputted through a system user interface.

In step 412, a final adjusted on-hand value of the product is calculated as a function of the on-hand adjustment value. The final adjusted on-hand value (sometimes referred to as the adjusted on-hand inventory value or quantity) can then be utilized, at least in part, in enhancing ordering additional items of the product to restock the retail store. As such, the on-hand adjustment value is used to compensate for estimated and/or predicted errors in the reference on-hand inventory quantity value that may result from one or more of the conditions identified above and/or other such conditions. The process 400 may be repeated for each product of interest that is to be considered. In other embodiments, the process 400 may evaluate multiple different products and/or all products of interest at the same time. Still further, in some embodiments, the process 400 is a continuous process that is continuously performed to automatically and continuously update the adjusted on-hand value for the one or more products of interest as relevant information and/or factors are received and/or detected. Alternatively, the process 400 may be a scheduled process that is performed in accordance with one or more predefined schedules (e.g., once a day, once a week, in response to preparing an order for a shipment, or other such scheduling or combinations of such scheduling). Some embodiments may further take into account predicted errors and/or conditions that may affect the quantity of the product that should be ordered in calculating the final adjusted on-hand value. For example, as described herein, some embodiments predict one or more items are going to be thrown away, stolen, incorrectly rung up at the register and/or other such errors. Accordingly, some embodiments may further modify the final adjusted on-hand value based on predicted conditions (e.g., predicting that one or more items of a product are to reach their shelf life and be thrown away, and increasing the final adjusted on-hand value based on the predicted throw-aways in attempts to avoid the inventory for that product dropping to zero or below a threshold so that the store continues to have the product on-hand and available to sell to customers).

In many instances, the store supplied on-hand adjustment value may be very accurate. For example, employees may be able to identify each item of a product that is on the store floor and held in a stock area waiting to be moved to the store floor. Similarly, there may not have been any losses of a product, the only items of a product are those that were recently received through a shipment, or other such conditions. As indicated above, however, in many instances, the store supplied on-hand adjustment value may not be accurate for one or more reasons. As such, some embodiments trust the store supplied on-hand adjustment value when the store supplied on-hand adjustment value is within a threshold quantity of a predicted or expected value. The predicted or expected value typically corresponds to the estimated on-hand adjustment value. Again, the estimated on-hand adjustment value is determined based on known and/or assumed errors. Accordingly, the estimated on-hand adjustment value is expected to be accurate within a margin of error, which may vary depending on the product and/or other factors (e.g., rate of sales, rate of theft, cost of product, etc.).

As described above, in those instances where the store supplied on-hand adjustment value does vary from the estimated on-hand adjustment value by the on-hand variation threshold or more, some embodiments trust the estimated on-hand adjustment value as being more accurate. Some embodiments may further modify the estimated on-hand adjustment value as a function of the store supplied on-hand adjustment, the estimated on-hand adjustment value, and/or a difference between the store supplied on-hand adjustment value and the estimated on-hand adjustment value. In some implementations, for example, the modification to the estimated on-hand adjustment value includes a modification in a direction of the difference between the store supplied on-hand adjustment value and the estimated on-hand adjustment value. For example, when the store supplied on-hand adjustment value is greater than the estimated on-hand adjustment value by at least the on-hand variation threshold, a modification to the estimated on-hand adjustment value can include an increase to the estimated on-hand adjustment value; and similarly, when the store supplied on-hand adjustment value is less than the estimated on-hand adjustment value by at least the on-hand variation threshold, a modification can decrease the estimated on-hand adjustment value. As further example, in modifying the estimated on-hand adjustment value as the function of the difference between the retail store supplied on-hand adjustment value and the estimated on-hand adjustment value, some embodiments identify whether the retail store supplied on-hand adjustment value corresponds to an increase adjustment or a decrease adjustment, and increase the estimated on-hand adjustment value when the retail store supplied on-hand adjustment value corresponds to an increase adjustment and decrease the estimated on-hand adjustment value when the retail store supplied on-hand adjustment value corresponds to an decrease adjustment.

The amount of modification applied to the estimated on-hand adjustment value can vary depending on many factors. In some implementations, the amount of modification to apply can be dependent at least in part on an amount of difference between the store supplied on-hand adjustment value and the estimated on-hand adjustment value. For example, a greater different may result in a greater modification. Additionally or alternatively, the amount of modification may be proportional to the amount of difference between the store supplied on-hand adjustment value and the estimated on-hand adjustment value (e.g., a percentage of the amount of difference). For example, the amount of modification may increase as the difference increases; however, the percentage increase may decrease as the difference increases (e.g., a 5% difference may result in a 1% modification, a 10% difference may result in a 2% increase, a 20% difference may result in a 3% increase, and a 50% difference may result in a 4% increase). The amount of modification may alternatively or additionally be dependent on the estimated on-hand adjustment value (e.g., the amount of modification may be proportional to and/or a percentage of the estimated on-hand adjustment value). As a further example, when the store supplied on-hand adjustment value is greater than a first percentage (e.g., 5%) of the estimated on-hand adjustment value and the store supplied on-hand adjustment value is negative, the estimated on-hand adjustment value may be modified by a second percentage, which may be equal to or different than the first percentage (e.g., modification is +5%); and when the store supplied on-hand adjustment value is greater than a third percentage (e.g., 5%) of the estimated on-hand adjustment value and the store supplied on-hand adjustment value is positive, no modification or a modification of zero is made to the estimated on-hand adjustment value. Further, in some embodiments, the amount of modification may be dependent, at least in part, on the product being evaluated, the rate of sales of the product, expected inventory variations of the product, cost of the product, shelf life of the product, or other such factors, and typically a combination of such factors. In some implementations, the derived variance is used, but it is applied to the store on-hand adjustment based on the direction (positive or negative) of the adjustment supplied by the store (e.g., the derived adjustment may be −32, while the store supplied on-hand adjustment is +100; and the resulting on-hand adjustment can be set to +35). Further, the determination of the direction for the adjustment (+/−) can be determined by the probability of store activities occurring. For example, the store feels they have too much or not enough when the store adjustment is too far outside the derived variance.

In some embodiments, the amount of difference between the store supplied on-hand adjustment value and the estimated on-hand adjustment value may be discounted and/or reduced based on one or more factors. In some instances, the difference is discounted proportional to the amount of difference (e.g., greater discounting is applied as the difference increases). Some embodiments may disregard some or all of the store supplied on-hand adjustment value based on one or more factors. For example, the supplied on-hand adjustment value may be disregarded when multiple modifications are made by a store employee to the supplied on-hand adjustment value or factors that are directly related to determining the store supplied on-hand adjustment value over a given period of time (e.g., 24 hours, a work shift, between shipments, etc.).

Other factors may be considered in determining the estimated on-hand adjustment value and/or an on-hand inventory value. As described above, some embodiments consider shipping errors, errors that occur at the register while ringing up a product (which may be an error by the person ringing up the product, an error in identifying and/or entering the product into inventory that results in an incorrect ring-up, and/or other such errors), throw-away errors, or the like, and typically a combination of such errors. Similarly, some embodiments predict potential errors and conditions that can affect the accuracy of the reference on-hand quantity value (e.g., predicting throw-aways, compensating for stolen products, predicting shipping errors, etc.). Still further, some embodiments take into consideration purchasing patterns, such as a significant drop-off in purchases of a product, a lack of sales of a product, and/or other such patterns.

In compensating for sales errors occurring at the register, some embodiments attempt to identify and/or compensate for missing a sale and erroneously gaining a sale of one or more products. For example, a person ringing up apples may ring up each red colored apple as a "Red Delicious" apple (e.g., because that is the product code the person remembers) even though the store may carry several different kinds of red colored apples, which should be rung up as different products to accurately track purchases of products. Accordingly, some embodiments compensate for the missed rings (e.g., erroneously gaining "Red Delicious" apples, and erroneously missing sales of red colored non-Red Delicious apples). Some embodiments, in identifying miss-rings, consider purchasing trends of products, detect sales of a product in excess of a the reference on-hand quantity value and/or a modified estimated on-hand adjustment value, track particular employees' patterns, utilize statistical data regarding miss-rings and/or typical product sales, or other such factors, and typically a combination of such factors. For example, some embodiments evaluate a current day's sales of a product relative to other days, evaluate current day's sales by a first employee at a register relative to the same or other day's sales by other employees at registers, and/or other such factors in identifying product miss-rings. Based on the one or more miss-ring factors, the estimated on-hand adjustment value for one or more products can be adjusted and/or on-hand inventory values can be adjusted. Some embodiments take into consideration store and/or industry statistics and/or standards. For example, based on the sales that occur at a store for a particular item, there may be known error rates based on industry standards for Universal Product Code (UPC) errors and product misidentification. Functional area testing for product identification on non-UPC items can also be considered and/or conducted, and statistical comparisons of sales vs. shipments can determine what items generate the highest miss-ring errors. Similarly, historical theft rates and re-keying rates of products can also be considered as contribution to a statistically probable error applied.

In some embodiments, a sales error is received and/or predicted corresponding to errors occurring during the sales of the product to one or more customers, for example, as a function of sales of the product exceeding a current on-hand value for the product. The estimated on-hand adjustment value can be determined as a function of the predicted or detected sales error. Similarly, some embodiments account for at least some stolen products by predicting a theft or a quantity of the product that will be stolen, and apply that as a miss-ring. The miss-ring can then be accounted for in the estimated on-hand adjustment value. For example, it may be determined based on historic evaluations that for every X number of a first product that is sold, a store anticipates that one of the first product will be stolen. Accordingly, some embodiments set and/or adjust a miss-ring error to account for the theft of the product for every X number of the first product (e.g., for every seven of the first product) that are detected as being sold.

As also described above, some errors in inventory accuracy also occur as a result of inaccurate notification and/or tracking of products being thrown away or otherwise discarded. Typically, throw-aways occur with products that have limited shelf life (e.g., produce, meat, dairy products, baked goods, chips, etc.). Once these products reach their shelf life stores typically throw the items away or otherwise discard the items. Further, store employees are typically supposed to note the throw-aways in an inventory system, throw-away system or otherwise notify the store of the throw-aways so that inventory can be accurately tracked. Often, however, products may be thrown away and no record is ever made of the throw-away. This can result in discard errors in the assumed inventory (e.g., items of inventory are typically assumed to be sold, and if not sold are assumed to still be on the shelves waiting to be purchased). Similarly, products that are stolen typically cannot be recorded with the inventory system as it is unknown that the product was taken from the store. As such, some embodiments may further increase the discard error to compensate for at least some stolen products based on throw-away tracking and/or prediction.

Accordingly, some embodiments track product shelf life of one or more products in determining a discard error that can be used in determining the estimated on-hand adjustment value. The corresponding shelf life of each item can be determined, in some implementation, as a function of one or more conditions at the retail store (e.g., conditions on the floor, in the stock area, etc.) where the product is placed throughout the store. Some embodiments may further take into consideration conditions at a supplier, a distribution center, shipping, location of harvesting, processing conditions, other conditions to which the product was exposed, or a combination of such conditions. Conditions that can affect the shelf life include but are not limited to one or more of ambient temperature(s), moisture and/or humidity levels, and/or other such conditions.

Using the knowledge of when the product is received, tracking items that are sold, and tracking those items that are recorded as thrown away, the number of a product that are still believed to be on the shelves (or in a storage area, etc.) can be identified that have exceeded their shelf life. The identified number of the product that have exceeded their shelf life can then be assumed to have been thrown away without being accurately recorded and the discard error can be adjusted accordingly. As such, the throw-away count is used to determine a discard error, which can be used in determining the estimated on-hand adjustment value for the product of interest. For example, some embodiments determine a discard error corresponding to one or more items of a product being discarded as a function of shelf life associated with conditions at the retail store and not compensated for in a reference on-hand quantity value, and determine the estimated on-hand adjustment value as a function of the discard error (e.g., for each item of a product determined to correspond to a discard error the estimated on-hand adjustment value may be increased by one). Some embodiments further take into consideration charitable contributions (donations), which may be factored into the discard error as a comparison in order to ensure the store is not accounting for the inventory in two places.

Some embodiments may further anticipate the expiration of one or more items of a product and predict the one or more items are going to be thrown away ("predictive throws"). Based on these predictions, the discard error can be adjusted, which can be used in determining and/or adjusting the estimated on-hand adjustment value in anticipation of one or more throw-aways to preempt the on-hand inventory of a product from dropping below a threshold and/or not having any of the product at the store for sale. For example, the estimate on-hand adjustment value can be increased ahead of throw-aways and/or the sales in order to continue to have products and get fresh products to the stores. This can further reduce and/or eliminate purchases from secondary or less desirable suppliers. In determining predicative throws, some embodiments compare the predicted shelf life to a current date, a date a product is received, and/or a date for which a shipment order is to be submitted or expected to be received. A quantity of one or more items of the product can be predicted that are anticipated to no longer be available for sale before they can be sold based on the comparison of the current date relative to the corresponding determined shelf life. A discard error can be increased as a function of the identified one or more items of the product anticipated to no longer be available for sale. The discard error can be used in determining the estimated on-hand adjustment value. Some embodiments may similarly anticipate the theft of products (e.g., based on historical thefts, which may itself be based on factors such as time of year, weather, etc.), and use the anticipated quantity of theft in determine the estimated on-hand adjustment value.

Further, the prediction of a quantity of the product that is going to be thrown away typically also takes into consideration the expected quantity of sales of the product. As such, even though it may be predicted that twenty items of a product are to reach a shelf life within the next 24 hours, it is further anticipated that the store will sell at least sixteen items of the product, which is used to reduce the quantity of the predictive throws. According, in some embodiments the predictive throws is not limited to predicting those items that are to reach their shelf life, but takes into consideration other factors, including expected sales.

In some embodiments, predictive throws uses a combination of factors that are often centered on industry standards for shelf life, independent observations and date tracking on product from the suppliers. It is typically dynamic depending on the season (e.g., produce). Further, similar diminished error threshold logic can be used in determining whether to use the forecast or historical sales patterns to establish a projected rate of sale to decrement against the adjusted on-hand. Additional probability logic can be applied for store area location (e.g., backroom or sales floor) and the operational characteristics of the store (e.g., labor hours applied, number of store adjustments made, etc.). Some embodiments may further track when the product was received at the store, counts out the number of shelf life days into the future (minus delivery time and system processing time) and adds the projected sales for the remaining days. Surplus can then be removed as a waste adjustment and tracked for a future set of days (FD) for store level reconciliation. If store waste adjustments are processed, the resulting value is removed from the predicted shelf life quantity for that day. This is done until the predicted quantities match the store processed adjustments or the future days (FD) is met.

Some embodiments, in determining predictive throws, identify a date that each item of a product of interest is received. The corresponding shelf life of each item can be determined as a function of the conditions at the retail store where the product is placed. A comparison can be made of the date the product of interest was received relative to the corresponding determined shelf life. A quantity of one or more items of the product are anticipated to no longer be available for sale before they can be sold can be determined or predicted based on the comparison of the date the product of interest was received relative to the corresponding determined shelf life. The discard error can be increased as a function of the identified one or more items of the product anticipated to no longer be available for sale.

Further, some embodiments attempt to compensate for one or more shipping errors associated with shipments of products received at the retail store. Shipping errors can be received that are based on historical shipping errors, which can be dependent on a number of products ordered, a supplier of the product, a distribution center distributing the product, products being received that cannot be sold (e.g., damaged, rotten, infestation, etc.), and other such historical information. Further, the historical information may be exclusive to the store. In other implementations, the historical information may include information from multiple different stores and/or distribution centers. The estimated on-hand adjustment value can then be determined as a function of the received one or more shipping errors. For example, for each item of a product that is not received or is received in excess, the estimated on-hand adjustment value can be modified by one.

In some embodiments, financial reconciliation and historical invoicing error data are used to derive the shipping error. Also, item attributes (e.g., weight, case count, etc.) and seasonal profile of the product can contribute to the error logic (e.g., in apple season where cases are heavy and case volume is high, there are typically increased errors from the distribution center). Some industry standards may be taken into consideration, but often have little impact to the overall numbers.

Further, some embodiments track sales of products and use this information in determining on-hand inventory and/or the estimated on-hand adjustment value. In tracking sales, some embodiments attempt to identify trends in sales, such as detecting and/or predicting diminished sales. Further, current quantities of sales can be evaluated relative to recent sales history and/or expected sales trends. Based on an identified ambiguity of current sales, some embodiments compensate for the ambiguity in the estimated on-hand adjustment value.

Some embodiments, for example, obtain sales history data of a product for one or more days, and typically multiple days. The selected and/or predefined number of days may vary depending on one or more factors, such as recent changes in sales, dramatic changes in sales, long term changes in sales, etc. Some embodiments select the number of days based on the forecasted rate of sale for an item at the store. This can also be compared to historical sales for a given day to predict which day the sale is likely to occur. Shipping frequency is often also considered prior to dividing the forecast by the number of eligible days (forecast and historical sales) to generate the number of days selected. Further, in some embodiments, the selected number of previous days may be limited to the same day in the week for which the estimated on-hand adjustment value is being determined and/or for which orders are expected to be submitted or received. For example, when the day being evaluated is a Monday, a predefined number of the most recent previous Mondays (e.g., four most recent previous Mondays) may be selected. Sales of the product of interest for each of the selected number of days are identified. The identified sales for one or more of the previous days can be used to determine and/or define a sales probability. The sales probability can include a single day's sales, an average number of the product sold over multiple days, and/or other such information.

Further, a daily sales forecast of the product for the day being evaluated is received. The forecast can be based on recent historical data, long term historical data (e.g., over multiple years), time of year, and other such factors. The forecast sales can then be evaluated relative to one or more of the sales of the product of interest for the selected number of days and/or the sales probability. For example, the forecast sales of the product can be compared to the sales probability of the product, and typically the sales probability of the product as a function of multiple previous days' sales.

Again, the sales probability can include or equal one or more of the sales of the product of interest for each of the selected number of days, to an average sales of the select number of days, a median of sales the select number of days, a maximum sales of the select number of days, or some other value corresponding to the sales of the select number of days. The evaluation includes making a determination regarding which of the daily forecast sales and the multiple recent days' sales is trusted more as being more accurate. In some embodiments, the evaluation comprises determining which of the daily forecast sales and the multiple recent days' sales is closer to a sales trend. In some implementations, the evaluation includes, at least in part, an evaluation relative to Markov logic. Additionally or alternatively, the more trusted of the forecasted sales and the sales probability can be selected or set as a sales trend as a function of the comparison.

Sales for a day of interest (or some other duration of time, such as a current week, a product ordering period, or other such period of time) can be further evaluated relative to the selected trend. A determination can be made whether sales of the product of interest for the day of interest (or other period of time) differs from the selected sales trend by more than a diminish sales threshold, which can indicate an inventory error in at least some instances. In some embodiments, the diminish sales threshold is dynamic and/or tunable relative to the product being evaluated, and in some instances currently existing and/or predicted conditions. The diminish sales threshold, in some implementations, represents percentage difference between actual verse predicted sales. Further, the diminish sales threshold may vary over time based on one or more factors, such as but not limited to the product being evaluated, changes in one or more trends of one or more products, short term historic sales (e.g., less than three months, and often less than one month), long term historic sales (e.g., one or more years), different store trends for one or more products, other such factors, and typically a combination of such factors. In some embodiments, the diminished sale threshold is a percentage determined by historical forecast error rates and the statistically derived variance between multiple stores selling that product. For example, 300 stores may meet the sales threshold at 10%, 500 stores at 20%, etc. This statistical spread can be used to find the most likely percentage drop in sales before a relevant store sample will be impacted by the setting.

When the sales of the product for the day of interest (e.g., yesterday, today, last week, etc.) differs from the sales trend by more than the diminish sales threshold the estimated on-hand adjustment value corresponding to the product of interest can further be modified as a function of the difference between the sales of the product for the day of interest and the sales trend producing a modified estimated on-hand adjustment value. For example, it can be identified that an average of five items of a product were sold over a selected number of days (e.g., the last consecutive four Mondays). Similarly, a forecast can be received or determined indicating predicted sales for the day of interest is five items of the product. As such, a trend can be set to the sale of five items of the product for the day of interest. The sales for the day of interest can then be evaluate relative to a diminish sales threshold (e.g., if the day of interest's sales are a % drop off from the predicted sale of five items). When the day of interest's sales are not within the diminish sales threshold, (e.g., less than a trend by more that the diminish sales threshold) an error is flagged, and the estimated on-hand adjustment value can be calculated and/or modified in accordance with the difference in sales relative to the diminish sales threshold and/or the difference between the day of interest's sales and the trend. In some embodiments, the amount of the adjustment value is either the forecasted rate of sales for the next day or the seasonally adjusted sales value as compared to the order point for the store (based on delivery frequency and system timing).

Further, some embodiments determine whether the sales of the product of interest for multiple days within a threshold period (e.g., threshold number of days, and typically a threshold number of consecutive days) differs from the corresponding sales trend by more than the diminish sales threshold. When each of the sales of the product for the multiple day within the threshold number of days differs from the sales trend by more than the diminish sales threshold the final adjusted on-hand value of the product is set to zero. For example, in some implementations when two consecutive day's sales are not within their respective diminish sales threshold, the final adjusted on-hand value of the product is set to zero. As such some embodiments consider whether modifications to the estimated on-hand adjustment value are made based on diminished sales for more than one day within a threshold period in determining whether further modifications to the estimated on-hand adjustment value, which in some instances includes setting the final adjusted on-hand value for the product being considered to zero.

For example, some embodiments determine an average number of sales of the same day of the week for the last four consecutive weeks (e.g., average number of sales for the last four consecutive Wednesdays). Further, some embodiments include negative sales (e.g., returned items of the product). As such, an absolute value of the average number of sales of the last four specific days of the week may be determined. A forecasted sales for the day of interest (e.g., today, a current Wednesday, etc.) is received and compared to the absolute average sales value. The comparison is evaluated relative to a diminish sales threshold. In some instances, when the absolute value of the average sales is greater by at least the diminish sales threshold (e.g., >10%) than the daily forecast sales, a trend can be defined to be equal to or be proportional to the absolute value of the average sales. Alternatively, the trend can be set equal to and/or proportional to the daily forecasted sales when the absolute value of the average sales is not greater by at least the diminish sales threshold (e.g., >10%) than the daily forecast sales then the trend can be set to be equal to or proportional to the forecast sales. The sales for the day of interest can then be evaluated relative to the set trend or some value proportional to the set trend (e.g., are the sales of the product for the day of interest less than 1.2 of the standard deviation of the set trend; are the sales of the product for the day of interest less 75% of the trend; or other similar evaluation). In those instance where the sales of the product for the day of interest are within a trend threshold of the set trend, then it is determined that the current on-hand inventory of the product of interest is within a desired range and adjustments are not implemented. Alternatively, when the sales of the product for the day of interest are not within a trend threshold of the set trend, then it is determined that the current on-hand inventory is insufficient and the estimated on-hand adjustment value is modified so that the resulting estimated on-hand quantity is believed to be low, which can allow for an increase in the number of products ordered and allowing for more of the product to be placed on the shelves. As one none limiting example, in some instances the estimated on-hand adjustment value may be modified based on a predefined set order level or order point (e.g., proportional to an order point minus a safety stop, divided by 2 ((order point−safety stop)/(2)). Again, this evaluation relative to set trends can be performed for multiple days, and in some implementations when the days of interest are not within thresholds of set trends for multiple days within a set period (e.g., two consecutive days, two out of three consecutive days, etc.), then the estimated on-hand adjustment value can be further modified (e.g., modified such that a final on-hand value is zero).

Some embodiments additionally or alternatively take into consideration dropped sales, which may result because inventory of a product of interest on the shelves is insufficient or there are no longer items of the product on the shelves and/or in inventory for purchase. This dropped sales evaluation can, in some implementations, take into consideration forecasted sales and/or a predicted volume of sales of different products. For example, as the volume of sales for different products increase, a threshold duration of evaluation of sales may vary.

Some embodiments, in evaluating and/or determining dropped sales identify a forecast threshold period of time corresponding to a product of interest as a function of a forecasted quantity of sales of the product forecasted to occur during the forecast threshold period of time. As such, in some embodiments, products with higher turnover are typically associated with a shorter forecast threshold period of time than products having a lower turnover. As a non-limiting example, a forecast threshold period of time for products having forecasted daily sales of greater than 50 items of the product may be set to one day or less; products having forecasted daily sales between 50 and 30 items of the product may have a forecast threshold period of time may be set to three days or less; products having forecasted daily sales between 30 and 15 items of the product may have a forecast threshold period of time may be set to five days or less; products having forecasted daily sales between 15 and 10 items of the product may have a forecast threshold period of time may be set to six days or less; products having forecasted daily sales between 10 and 2 items of the product may have a forecast threshold period of time may be set to eight days or less; and products having forecasted daily sales less than 2 items of the product may have a forecast threshold period of time may be set to ten days or less. The forecast threshold period of time is typically dependent at least on the predicted quantity of sales; however, the forecast threshold period of time may vary based on one or more factors, such as but not limited to a type of product, time of year, trends and/or other such factors.

Based on a corresponding forecast threshold period of time, sales of a product can be evaluated to determine whether sales of that product have dropped. Some embodiments make a determination of whether a drop threshold quantity of items of the product are sold during the forecast threshold period of time (e.g., has at least one item of the product been sold, has at least five items of the product been sold within the forecast threshold period, etc.). Further, some implementations take into consideration throw-aways of the product. For example, sales and throw-aways of a product can be considered relative to the drop threshold. In those instances where sales of the product does not exceed at least the drop threshold quantity (and/or thrown away) during the forecast threshold period of time, the estimated on-hand adjustment value may be modified to try to compensate for the dropped sales. In some instances, the estimated on-hand adjustment value is modified to ensure that the final adjusted on-hand value of the product is set to zero and/or the estimated on-hand adjustment value is overridden to ensure that the final adjusted on-hand value is set to zero. Accordingly, some embodiments make a determination whether and/or that an actual on-hand value of the product is zero when the sales of a product are not within a drop threshold during the forecast threshold period of time.

Again, the forecast threshold period of time is typically set inversely proportional to the forecasted quantity of sales. As another non-limiting example, in some embodiments and/or with some products: when forecasted sales are greater than 20 the forecast threshold period of time may be set to two days; forecast sales are between 10-20 the forecast threshold period of time may be set to four days; forecast sales or between 2-10 days the forecast threshold period of time may be set to six days; and forecast sales of less than 2 days the forecast threshold may be set to twelve days. As described above, in some implementations when sales of the product does not at least meet the drop threshold for the product (e.g., at least five, at least one, etc.) within the threshold period of time, the estimated on-hand adjustment value may be modified and/or the final adjusted on-hand value of the product may be set to zero.

Figure 5:
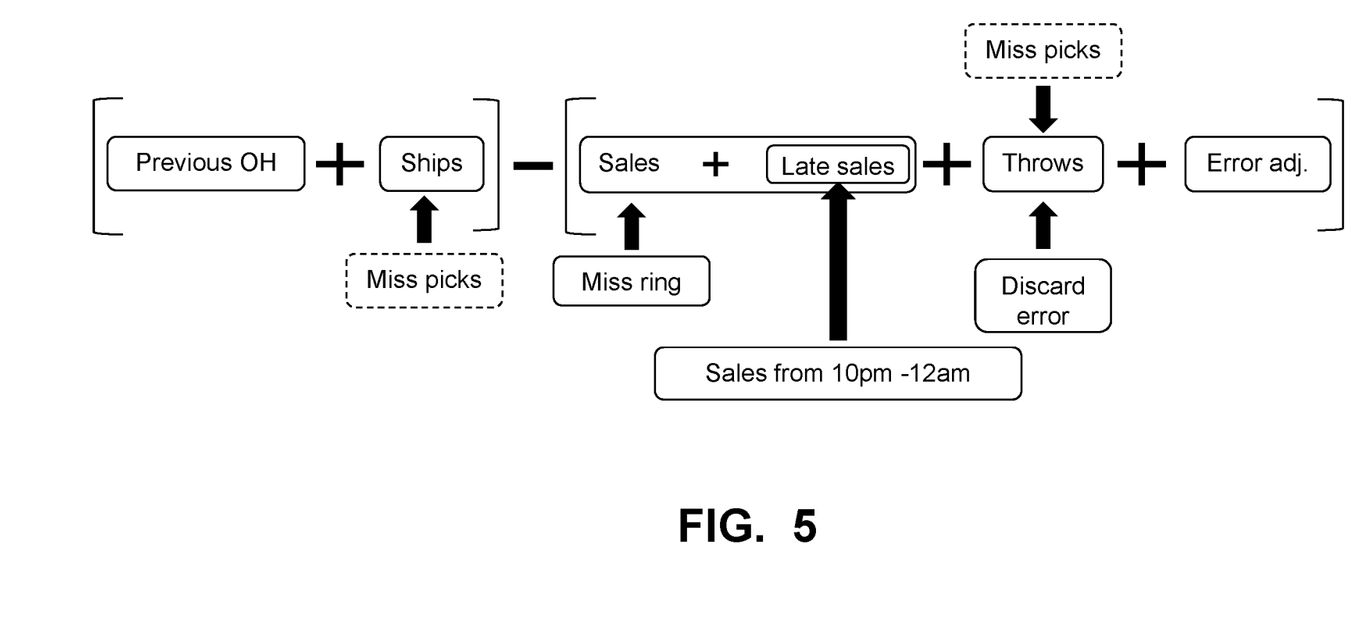
FIG. 5 shows a simplified block diagram of an exemplary process of determining an estimated current on-hand inventory value and/or a final adjusted on-hand value for one or more products of interest, in accordance with some embodiments.

FIG. 5 shows a simplified block diagram of an exemplary process 510 of determining an estimated current on-hand inventory value and/or a final adjusted on-hand value for one or more products of interest, in accordance with some embodiments. In some implementations, the process 510 is performed for each product of interest. In other instances, however, multiple products may be cooperatively evaluated. Initially, a reference or previous on-hand inventory value for a product of interest is obtained. For example, yesterday's on-hand inventory is obtained. This previous on-hand inventory is adjusted to include any incoming shipments that are received since the previous or reference on-hand inventory value was determined. As described above, in some instances, shipping errors may occur (sometimes referred to as "miss picks"). Accordingly, some embodiments compensate for these shipping errors may modifying the shipping data.

As also described above, the sales of the product of interest can be tracked, typically through the checkout system 106, and provided to the inventory system 102. In some embodiments, late sales of the product may not be included in and/or known when sales are determined and/or when previous evaluations are performed. Accordingly, late sales may be further considered. Still further, many embodiments further consider sales error (sometimes referred to as "miss rings") that are received and/or predicted, and which correspond at least in part to errors occurring during the sale or ringing up of the product to one or more customers.

Notification of throw-aways are further received and can be taken into consideration. In some embodiments, store employees report thrown away items of the product, for example, through the inventory system, a throw-away tracking system or through other methods. Further, as described above, some embodiments determine and/or receive a discard error that attempts to track, identify and/or receive information about items of the product that are thrown away and no record is made of the throw-away. Similarly, in some instances stolen products may be compensated for through the throw-aways. In some embodiments, some or all of the sales errors and/or shipping errors may be addressed at least in part through the discard errors, again which is typically associated with throw-aways but not limited to throw-aways. Using this information the estimated on-hand adjustment value can be determined. Still further, some embodiments evaluate the estimated on-hand adjustment value with respect to the store supplied on-hand adjustment value (sometimes referred to as the stored supplied adjustment). As such, the inventory system can identify and/or adjust on-hand inventory information to more accurately reflect the actual on-hand inventory, and/or be used in adjusting shipping orders of the product.

Further, some embodiments apply one or more additional conditions and/or filtering to adjustments to the on-hand inventory and/or the determination of estimated on-hand adjustment values. In some implementations, the one or more additional filtering allows the inventory system 102 to make a determination regarding an accuracy of store supplied adjustments. The additional filtering often corresponds to actions taken by store employees that may alter current inventory information and/or affect an accuracy of inventory information or adjustments. For example, some embodiments determine whether multiple manual adjustments have been applied to an inventory count within a single evaluation period (e.g., within a day). In some embodiments, store employees may adjust inventory counts in order allow and/or force an action (e.g., allow an order to be placed) and then readjust the inventory count to what is believed to be accurate levels. Accordingly, some embodiments disregard one or more of these manual adjustments and/or do not determine an estimated on-hand adjustment value for a current evaluation period. Some embodiments consider whether one or more secondary purchases that are made for a product being evaluated. Secondary purchases are typically considered purchases made outside of typical ordering and/or supply chains or networks, such as through outside vendors and the like. Often, these are not authorized restocking, and may not be taken into consideration in evaluating on-hand inventory. Similarly, some embodiments consider whether store supplied on-hand adjustment values are in excess of one or more thresholds, and as such may be considered extreme and/or anomaly adjustments. Such extreme adjustments or typically disregarded and/or discounted in determining an estimated on-hand adjustment value and/or the final adjusted on-hand value of a product being evaluated. Other such filtering may be applied in an effort to confirm information being provided, typically by employees and/or tracked by the inventory system, and/or determine whether such information can be relied upon. One or more of these filtering may be applied; however, in some instances none of the filtering is applied. Further, such filtering may vary based on one or more factors, such as time of year, product being evaluated, rate of sales of the product being evaluated, historical data, and other such factors. Similarly, the evaluation between the estimated on-hand adjustment value and the store supplied on-hand adjustment value may vary and/or thresholds may vary based on similar factors.

One or more of the embodiments, methods, processes, approaches, and/or techniques described above or below may be implemented in one or more computer programs executable by a processor-based system. By way of example, such a processor based system may comprise one or more computers, servers, data processing centers, database centers, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to monitory and/or adjust on-hand inventory. As another example, such computer programs may be used for implementing any type of system, tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a control circuit, computer and/or processor based system to execute steps comprising: by a control circuit of a retail store inventory system, for each of multiple different products at a retail store: obtaining, through the retail store inventory system, a reference on-hand quantity value for a product providing a reference quantity of the product; determining an estimated on-hand adjustment value of the product corresponding to a predicted error between the reference on-hand quantity value and a predicted actual on-hand value at the retail store; receiving a retail store supplied on-hand adjustment value; setting an on-hand adjustment value to the retail store supplied on-hand adjustment value when the retail store supplied on-hand adjustment value is within an on-hand variation threshold of the estimated on-hand adjustment value; modifying the estimated on-hand adjustment value as a function of a difference between the retail store supplied on-hand adjustment value and the estimated on-hand adjustment value when the retail store supplied on-hand adjustment value is not within the on-hand variation threshold of the estimated on-hand adjustment value, and set the on-hand adjustment value to the modified estimated on-hand adjustment value; and calculating a final adjusted on-hand value of the product as a function of the on-hand adjustment value, wherein the final adjusted on-hand value is configured to be utilized in enhancing ordering additional items of the product to restock the retail store.

Further, some embodiments enhance on-hand inventory accuracy, which in turn allows for more accurate product ordering and sales, and increase store efficiency and profit margins. The improvement provided by some embodiments further can provide fresh and healthy choices to customers, reduce the time spent on daily tasks giving store employees more time to focus on the customers and improved service, as well as saving customers money.

The described features, structures, or characteristics of the invention may be combined in any suitable manner in one or more embodiments. In the following description, numerous specific details are provided. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention. The embodiments shown in the drawings, if any, and as described above are merely for illustrative purposes and not intended to limit the scope of the invention. Moreover, those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An inventory apparatus for use in managing product inventory, comprising:
   an inventory database comprising multiple memory communicatively coupled over a distributed communication network, wherein the inventory database maintains on-hand inventory quantities of multiple different products offered for sale from a retail store;
   a control circuit of a retail store inventory system comprising a plurality of processors, wherein each of the plurality of processors is communicatively coupled over the distributed communication network with the inventory database;
   a checkout system communicatively coupled over the distributed communication network with the control circuit and configured to complete sales of products to customers at the retail store, and is further configured to communicate sales information of the sales of the multiple different products from the retail store;
   a memory coupled to the control circuit and storing computer instructions that when executed by the control circuit cause the control circuit to perform the steps of:
   for each of the multiple different products at the retail store:
   automatically maintain and update over time, through the retail store inventory system, a reference on-hand quantity value for each of the multiple different products based on the sales information, from the checkout system, and inventory activities at the retail store corresponding to the respective one of the multiple different products, wherein the reference on-hand quantity value defines a reference expected quantity of a product to be at the retail store and available to be sold at a time of evaluating inventory of at least the product;
   obtain, through the retail store inventory system, the reference on-hand quantity value for the product providing a reference quantity of the product;
   automatically determine, without user interaction, an estimated on-hand adjustment value of the product corresponding to a predicted error between the reference on-hand quantity value and a predicted actual on-hand value at the retail store, wherein the estimated on-hand adjustment value is configured to be used to adjust a corresponding on-hand inventory value;
   receive a retail store supplied on-hand adjustment value corresponding to a different predicted error between the reference on-hand quantity value and the predicted actual on-hand value at the retail store;

access an on-hand variation threshold that is dependent on the product,
compare the retail store supplied on-hand adjustment value to the estimated on-hand adjustment value;
automatically set, without user interaction, an on-hand adjustment value to the retail store supplied on-hand adjustment value when the retail store supplied on-hand adjustment value is within the on-hand variation threshold of the estimated on-hand adjustment value;
automatically modify, without user interaction, the estimated on-hand adjustment value as a function of a difference between the retail store supplied on-hand adjustment value and the estimated on-hand adjustment value when the retail store supplied on-hand adjustment value is not within the on-hand variation threshold of the estimated on-hand adjustment value, and set the on-hand adjustment value to the modified estimated on-hand adjustment value, wherein the automatically modifying the estimated on-hand adjustment value comprises increasing the estimated on-hand adjustment value when the retail store supplied on-hand adjustment value is greater than the estimated on-hand adjustment value and the retail store supplied on-hand adjustment value is not within the on-hand variation threshold; and decreasing the estimated on-hand adjustment value when the retail store supplied on-hand adjustment value is less than the estimated on-hand adjustment value and the retail store supplied on-hand adjustment value is not within the on-hand variation threshold;
automatically, without user interaction, calculate a final adjusted on-hand value of the product as a function of the on-hand adjustment value, wherein the final adjusted on-hand value is configured be utilized in enhancing ordering additional items of the product to restock the retail store; and
automatically, by the control circuit, order items of the products based on the final adjusted on-hand value of the product in controlling restocking of the retail store.

2. The inventory apparatus of claim 1, wherein the control circuit, for each of the multiple different products, is further configured to:
compare forecasted sales of the product to a sales probability of the product as a function of multiple previous days' sales;
select, as a function of the comparison, one of the sales probability and the forecasted sales as a sales trend; and
make a determination whether sales of the product for a current day differs from the sales trend by more than a diminish sales threshold; and
wherein the control circuit in modifying the estimated on-hand adjustment value further modifies the estimated on-hand adjustment value corresponding to the product as a function of the difference between the sales of the product for the current day and the sales trend producing the modified estimated on-hand adjustment value when the sales of the product for the current day differs from the sales trend by more than the diminish sales threshold.

3. The inventory apparatus of claim 2, wherein the control circuit is further configured to make a determination that the sales of the product for multiple days within a threshold number of days differs from the corresponding sales trend by more than the diminish sales threshold, and to set the final adjusted on-hand value of the product to zero when each of the sales of the product for the multiple days within the threshold number of days differs from the sales trend by more than the diminish sales threshold.

4. The inventory apparatus of claim 1, wherein the control circuit, for one or more of the multiple different products, is further configured to:
make a determination that an actual on-hand value of the product is zero comprising:
receive a forecast threshold period of time corresponding to the product as a function of a forecasted quantity of sales of the product forecasted to occur during the forecast threshold period of time;
make a determination of whether a drop threshold quantity of items of the product are sold during the forecast threshold period of time; and
set the final adjusted on-hand value of the product to zero when a quantity of the product sold during the forecast threshold period of time does not exceed the drop threshold.

5. The inventory apparatus of claim 4, wherein the control circuit in identifying the forecast threshold period of time is further configured to set the forecast threshold period of time inversely proportional to the forecasted quantity of sales.

6. The inventory apparatus of claim 1, wherein the control circuit, for one or more of the multiple different products, is configured to detect a sales error, based on the sales information from the checkout system, corresponding to errors occurring during the sales of the product to one or more customers as a function of sales of the product exceeding a current on-hand value for the product, and determine the estimated on-hand adjustment value as a function of the detected sales error.

7. The inventory apparatus of claim 1, wherein the control circuit, for one or more of the multiple different products, is further configured to determine a discard error corresponding to one or more items of the product being discarded as a function of shelf life associated with conditions at the retail store and not compensated for in the reference on-hand quantity value, and determine the estimated on-hand adjustment value as a function of the discard error.

8. The inventory apparatus of claim 7, wherein the control circuit, for one or more of the multiple different products, is configured to determine the corresponding shelf life of each item as a function of one or more conditions at the retail store where the product is placed, compare the corresponding determined shelf life relative to a current date, predict a quantity of one or more items of the product are anticipated to no longer be available for sale before they can be sold based on the comparison of the corresponding determined shelf life and the current date, and increase the discard error as a function of the identified one or more items of the product anticipated to no longer be available for sale.

9. The inventory apparatus of claim 1, wherein the control circuit, for one or more of the multiple different products, is configured to:
determine a corresponding shelf life of each item of the product as a function of one or more conditions at the retail store where the product is placed;
compare the corresponding determined shelf life relative to a current date;
predict a quantity of one or more of the items of the product are anticipated to no longer be available for sale before the one or more items can be sold based on the comparison of the corresponding determined shelf life relative to the current date;
determine a discard error as a function of the identified one or more items of the product anticipated to no longer be available for sale; and
determine the estimated on-hand adjustment value as a function of the discard error.

10. A method for use in managing product inventory, comprising:

by a control circuit of a retail store inventory system comprising, for each of multiple different products at a retail store:

automatically maintaining and updating over time, through the retail store inventory system, a reference on-hand quantity value for each of the multiple different products based on sales information, received from a checkout system, and inventory activities at the retail store corresponding to a respective one of multiple different products offered for sale from the retail store, wherein the reference on-hand quantity value defines a reference expected quantity of a product to be at the retail store and available to be sold at a time of evaluating inventory of at least the product;

obtaining, through the retail store inventory system, the reference on-hand quantity value for a product providing a reference quantity of the product;

automatically determining, without user interaction, an estimated on-hand adjustment value of the product corresponding to a predicted error between the reference on-hand quantity value and a predicted actual on-hand value at the retail store, wherein the estimated on-hand adjustment value is configured to be used to adjust a corresponding on-hand inventory value;

receiving a retail store supplied on-hand adjustment value corresponding to a different predicted error between the reference on-hand quantity value and the predicted actual on-hand value at the retail store;

accessing an on-hand variation threshold that is dependent on the product comparing the retail store supplied on-hand adjustment value to the estimated on-hand adjustment value;

automatically setting, without user interaction, an on-hand adjustment value to the retail store supplied on-hand adjustment value when the retail store supplied on-hand adjustment value is within the on-hand variation threshold of the estimated on-hand adjustment value;

automatically modifying, without user interaction, the estimated on-hand adjustment value as a function of a difference between the retail store supplied on-hand adjustment value and the estimated on-hand adjustment value when the retail store supplied on-hand adjustment value is not within the on-hand variation threshold of the estimated on-hand adjustment value, and set the on-hand adjustment value to the modified estimated on-hand adjustment value, wherein the automatically modifying the estimated on-hand adjustment value comprises increasing the estimated on-hand adjustment value when the retail store supplied on-hand adjustment value is greater than the estimated on-hand adjustment value and the retail store supplied on-hand adjustment value is not within the on-hand variation threshold; and decreasing the estimated on-hand adjustment value when the retail store supplied on-hand adjustment value is less than the estimated on-hand adjustment value and the retail store supplied on-hand adjustment value is not within the on-hand variation threshold;

automatically, without user interaction, calculating a final adjusted on-hand value of the product as a function of the on-hand adjustment value, wherein the final adjusted on-hand value is configured to be utilized in enhancing ordering additional items of the product to restock the retail store; and automatically ordering, by the control circuit, items of the products based on the final adjusted on-hand value of the product in controlling restocking of the retail store.

11. The method of claim 10, further comprising:

comparing forecasted sales of the product to a sales probability of the product as a function of multiple previous days' sales;

selecting, as a function of the comparison, one of the sales probability and the forecasted sales as a sales trend; and making a determination whether sales of the product for a current day differs from the sales trend by more than a diminish sales threshold; and wherein the modifying the estimated on-hand adjustment value further comprises modifying the estimated on-hand adjustment value corresponding to the product as a function of the difference between the sales of the product for the current day and the sales trend producing the modified estimated on-hand adjustment value when the sales of the product for the current day differs from the sales trend by more than the diminish sales threshold.

12. The method of claim 11, further comprising:

making a determination that the sales of the product for multiple days within a threshold number of days differs from the corresponding sales trend by more than the diminish sales threshold; and setting the final adjusted on-hand value of the product to zero when each of the sales of the product for the multiple days within the threshold number of days differs from the sales trend by more than the diminish sales threshold.

13. The method of claim 10, further comprising:

making a determination that an actual on-hand value of the product is zero comprising:

receiving a forecast threshold period of time corresponding to the product as a function of a forecasted quantity of sales of the product that are forecasted to occur during the forecast threshold period of time;

making a determination of whether a drop threshold quantity of items of the product are sold during the forecast threshold period of time; and setting the final adjusted on-hand value of the product to zero when a quantity of the product sold during the forecast threshold period of time does not exceed the drop threshold.

14. The method of claim 10, for one or more of the multiple different products, further comprising:

detect a sales error, based on the sales information from the checkout system, corresponding to errors occurring during the sales of the product to one or more customers as a function of sales of the product exceeding a current on-hand value for the product; and wherein the determining the estimated on-hand adjustment value comprises determining the estimated on-hand adjustment value as a function of the detected sales error.

15. The method of claim 10, for one or more of the multiple different products, further comprising:

determining a discard error corresponding to one or more items of the product being discarded as a function of shelf life associated with conditions at the retail store and not compensated for in the reference on-hand quantity value; and determining the estimated on-hand adjustment value as a function of the discard error.

16. The method of claim 15, further comprising:

for one or more of the multiple different products, determining the corresponding shelf life of each of the items as a function of one or more conditions at the retail store where each of the items of the product is placed;

comparing the corresponding determined shelf life relative to a current date;

predicting a quantity of the one or more items of the product that are anticipated to no longer be available for sale before the one or more items can be sold based on the comparison of the corresponding determined shelf life and the current date; and increasing the discard error as a function of the identified one or more items of the product anticipated to no longer be available for sale.

17. The method of claim 10, further comprising:

for one or more of the multiple different products, determining a corresponding shelf life of each item of the product as a function of one or more conditions at the retail store where the product is placed;

comparing the corresponding determined shelf life relative to a current date;

predicting a quantity of one or more of the items of the product that are anticipated to no longer be available for sale before the one or more items can be sold based on the comparison of the corresponding determined shelf life relative to the current date;

calculating a discard error as a function of the identified one or more items of the product anticipated to no longer be available for sale; and determining the estimated on-hand adjustment value as a function of the discard error.

18. The inventory apparatus of claim 1, wherein the control circuit, for one or more of the multiple different products, is further configured to:

identify, by the control circuit, when a threshold number of modifications are made, within a threshold period of time, to one or more factors directly related to determining the store supplied on-hand adjustment value;

disregard the store supplied on-hand adjustment value and set the final adjusted on-hand value of to the estimated on-hand adjustment value when the threshold number of modifications are made to the one or more factors within the threshold period of time.

19. The inventory apparatus of claim 18, wherein the control circuit, for one or more of the multiple different products, is further configured to:

wherein the automatically modifying the estimated on-hand adjustment value comprises identifying the difference between the retail store supplied on-hand adjustment value and the estimated on-hand adjustment value is discounted proportional to the amount of difference between the retail store supplied on-hand adjustment value and the estimated on-hand adjustment value and modifying the estimated on-hand adjustment value proportional to the discounted difference between the retail store supplied on-hand adjustment value and the estimated on-hand adjustment value.

20. The inventory apparatus of claim 9, wherein the control circuit is further configured to:

adjust the discard error, prior to determining the estimated on-hand adjustment value as a function of the discard error, as a function of a predicted number of stollen products proportional to a quantity of the product sold based on the sales information from the checkout system.

* * * * *

UNITED STATES PATENT AND TRADEMARK OFFICE
CERTIFICATE OF CORRECTION

PATENT NO. : 11,093,893 B2  Page 1 of 1
APPLICATION NO. : 15/541283
DATED : August 17, 2021
INVENTOR(S) : Gregory D. Dixon et al.

It is certified that error appears in the above-identified patent and that said Letters Patent is hereby corrected as shown below:

In the Claims

Column 21, Line 2, Claim 1, delete "product," and insert --product;--.

Column 21, Line 33, Claim 1, delete "configured be" and insert --configured to be--.

Column 23, Line 32, Claim 10, delete "product" and insert --product;-- followed by a hard return.

Column 26, Line 6, Claim 18, delete "value of to the" and insert --value to the--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*